(12) United States Patent
Johnson

(10) Patent No.: US 8,565,416 B2
(45) Date of Patent: Oct. 22, 2013

(54) CACHE-BASED ECHO CANCELLER

(75) Inventor: Andrew Johnson, Charlotte, NC (US)

(73) Assignee: Cisco Technology, Inc., San Jose, CA (US)

( * ) Notice: Subject to any disclaimer, the term of this patent is extended or adjusted under 35 U.S.C. 154(b) by 1744 days.

(21) Appl. No.: 11/377,960

(22) Filed: Mar. 17, 2006

(65) Prior Publication Data

US 2007/0217599 A1 Sep. 20, 2007

(51) Int. Cl.
*H04M 9/08* (2006.01)
(52) U.S. Cl.
USPC ............ 379/406.08; 379/406.02; 379/406.11; 379/406.12; 370/286
(58) Field of Classification Search
USPC ................... 379/406.1–406.16; 370/286–292
See application file for complete search history.

(56) References Cited

U.S. PATENT DOCUMENTS

| | | | | |
|---|---|---|---|---|
| 4,987,569 | A * | 1/1991 | Ling et al. | 370/292 |
| 7,155,018 | B1 * | 12/2006 | Stokes et al. | 381/66 |
| 2003/0202654 | A1 * | 10/2003 | Xiong | 379/406.01 |
| 2003/0231617 | A1 * | 12/2003 | Ubale | 370/352 |
| 2004/0001450 | A1 * | 1/2004 | He et al. | 370/286 |
| 2004/0101131 | A1 * | 5/2004 | Bist et al. | 379/406.01 |
| 2004/0114752 | A1 * | 6/2004 | Rude et al. | 379/406.01 |
| 2004/0120271 | A1 * | 6/2004 | LaBlanc | 370/286 |
| 2004/0125944 | A1 * | 7/2004 | Popovic et al. | 379/406.01 |
| 2005/0207567 | A1 * | 9/2005 | Parry et al. | 379/406.01 |
| 2005/0220043 | A1 * | 10/2005 | Handel et al. | 370/286 |
| 2007/0116254 | A1 * | 5/2007 | Looney et al. | 379/406.01 |
| 2007/0133442 | A1 * | 6/2007 | Masuda et al. | 370/286 |

FOREIGN PATENT DOCUMENTS

WO 2007108850 9/2007

OTHER PUBLICATIONS

USPTO: PCT US06/61039 filed Nov. 17, 2006; International Search Report and Written Opinion; Oct. 25, 2007; 10 Pages.

* cited by examiner

*Primary Examiner* — Duc Nguyen
*Assistant Examiner* — Ibraham Sharifzada
(74) *Attorney, Agent, or Firm* — Lempia Summerfield Katz LLC

(57) ABSTRACT

A system and methods for pre-configuring echo cancellers are shown and described. The system includes a storage device for storing one or more settings of the echo cancellation parameters developed during one or more previously established data connections, and an echo canceller for cancelling echo associated with one or more data connections according to echo cancellation parameters, the echo canceller initially configuring the echo cancellation parameters according to settings developed during previous data connections.

21 Claims, 5 Drawing Sheets

CACHE-BASED ECHO CANCELLER

FIELD OF THE INVENTION

This invention relates generally to echo cancellers and, more specifically, to a system and method for initially configuring and automatically tuning echo cancellation parameters.

BACKGROUND OF THE INVENTION

When communicating over circuit-switched networks, such as Public Switched Telephone Networks (PSTNs) or legacy Private Branch Exchanges (PBXs), most voice data transmissions reflect some signal energy back towards their source. This phenomenon, commonly known as echo or hybrid echo, typically occurs at physical transitions within the circuit-switched networks, e.g., 4-wire to 2-wire conversion points. Since perception of reflected signal energy by callers can dramatically degrade the quality of a call, modern communication systems include one or more echo cancellers to detect and cancel hybrid echo prior to caller perception.

Echo cancellers typically cancel hybrid echo according to a plurality of echo cancellation parameters, i.e., input gain, output attenuation, impedance, echo return loss (ERL), combined signal loss (ACOM), etc. Between call termination and establishment of the next call, these echo cancellation parameters are often reset to a default setting and then automatically tuned according to the hybrid echo generated during each call. Although this automatic tuning enables echo cancellers to dynamically eliminate hybrid echo associated with the calls, a period of time exists prior to the automatic tuning where the echo cancellers rely upon the default setting to cancel the hybrid echo. Since the default setting of the echo cancellation parameters commonly requires significant adjustment before the echo cancellers can effectively eliminate the hybrid echo, some hybrid echo may be perceived by callers prior to the completion of the automatic tuning, thus degrading call quality.

DETAILED DESCRIPTION

In communications over circuit-switched networks, such as Public Switched Telephone Networks (PSTNs) and legacy Private Branch Exchanges (PBXs), the ability to cancel echo is advantageous. As described above, previous echo cancellation techniques typically fail to cancel echo prior to automatically tuning one or more echo cancellation parameters. However, by initially configuring the echo cancellation parameters according to settings developed during one or more previously established data connections, echo cancellers can eliminate much of the echo perceived by callers prior to the automatic tuning. Embodiments of the present invention will now be described in more detail.

Figure 1:
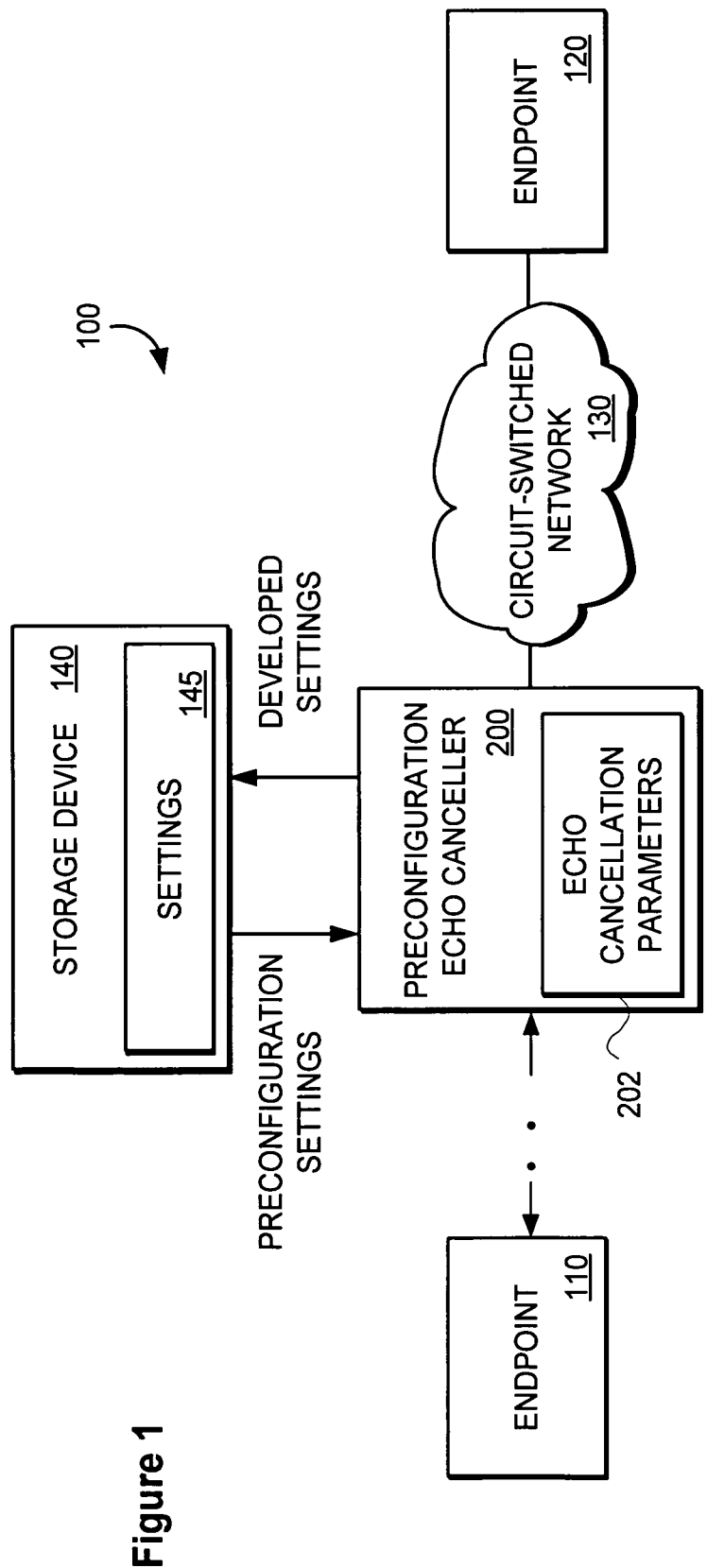
FIG. 1 illustrates, in block form, a communication system that provides improved echo cancellation.

FIG. 1 illustrates, in block form, a communication system that provides improved echo cancellation. Referring to FIG. 1, a communication system 100 includes endpoints 110 and 120 at opposite ends of a data connection established at least partially over a circuit-switched network 130. The circuit-switched network 130 may be a PSTN, a legacy PBX, or any dedicated-path communication network. Endpoint 120 may be a telephone or any other device capable of communicating over the circuit-switched network 130.

The communications system 100 includes a preconfiguration echo canceller 200 coupled to the circuit-switched network 130 for canceling echo generated during the data connection. For instance, when endpoint 110 transmits voice data signals to endpoint 120 over the circuit-switched network 130, the preconfiguration echo canceller 200 detects and cancels energy from those voice data signals that the circuit-switched network 130 reflects or echoes back towards the endpoint 110. The preconfiguration echo canceller 200 may couple to endpoint 110 through another network (not shown), such as a packet-switched network. The endpoint 110 may be a telephone, a Voice over Internet Protocol (VoIP) endpoint, or any other device capable of communicating with endpoint 120 over the circuit-switched network 130.

The preconfiguration echo canceller 200 cancels echo according to one or more echo cancellation parameters 202, e.g., input gain, output attenuation, impedance, echo return loss (ERL), combined signal loss (ACOM), etc. The preconfiguration echo canceller 200 may automatically tune the echo cancellation parameters 202 to cancel echo generated during the data connection. Thus, over the course of the data connection the preconfiguration echo canceller 200 maintains the ability to dynamically develop a setting for the echo cancellation parameters 202 that optimally cancels the generated echo for that data connection.

Prior to completion of the automatic tuning, the preconfiguration echo canceller 200 relies upon an initial configuration of the echo cancellation parameters 202 to cancel the generated echo. When this initial configuration does not enable the preconfiguration echo canceller 200 to effectively cancel the echo generated during the data connection, some of the generated echo is passed-through to the endpoint 110 degrading the quality of the data connection. The preconfiguration echo canceller 200, therefore, maintains the ability to initially configure the echo cancellation parameters 202 to reduce or eliminate initial echo pass-through to endpoint 110.

For example, since related data connections, e.g., those data connections dedicated with same or similar paths through the circuit-switched network 130, generate echo with the same or similar characteristics, the preconfiguration echo canceller 200 can initially cancel echo generated in one data connection according to settings 145 previously developed during one or more related data connections. In other words, by initially configuring or preconfiguring the echo cancellation parameters 202 for new data connections according to at least one previously developed setting 145, the preconfiguration echo canceller 200 can reduce or eliminate initial echo pass-through to endpoint 110.

The communication system 100 includes a storage device 140 to store settings 145 developed during previously established data connections for use in initially configuring the echo cancellation parameters 202 of one or more subsequent data connections. The storage device 140 receives and stores the developed settings 145 from the preconfiguration echo canceller 200. During the establishment of a new data connection, the preconfiguration echo canceller 200 receives one or more preconfiguration settings 145 from the storage device 140 and initially configures the echo cancellation parameters 202 according to the preconfiguration settings 145. The storage device may be a cache, a memory, or any other device capable of storing the developed settings 145.

In data connections between endpoints 110 and 120, the preconfiguration echo canceller 200 may initially configure the echo cancellation parameters 202 according to one or more preconfiguration settings 145 corresponding to previous data connections with endpoint 120. In some embodiments, the preconfiguration settings 145 provided to the preconfiguration echo canceller 200 may correspond to one or more previous data connections with other endpoints (not shown). When multiple settings 145 are provided to the preconfiguration echo canceller 200, the preconfiguration echo canceller 200 may average the preconfiguration settings 145 or perform some other mathematical or logical manipulation on the settings 145 prior to initially configuring the echo cancellation parameters 202.

Figure 2:
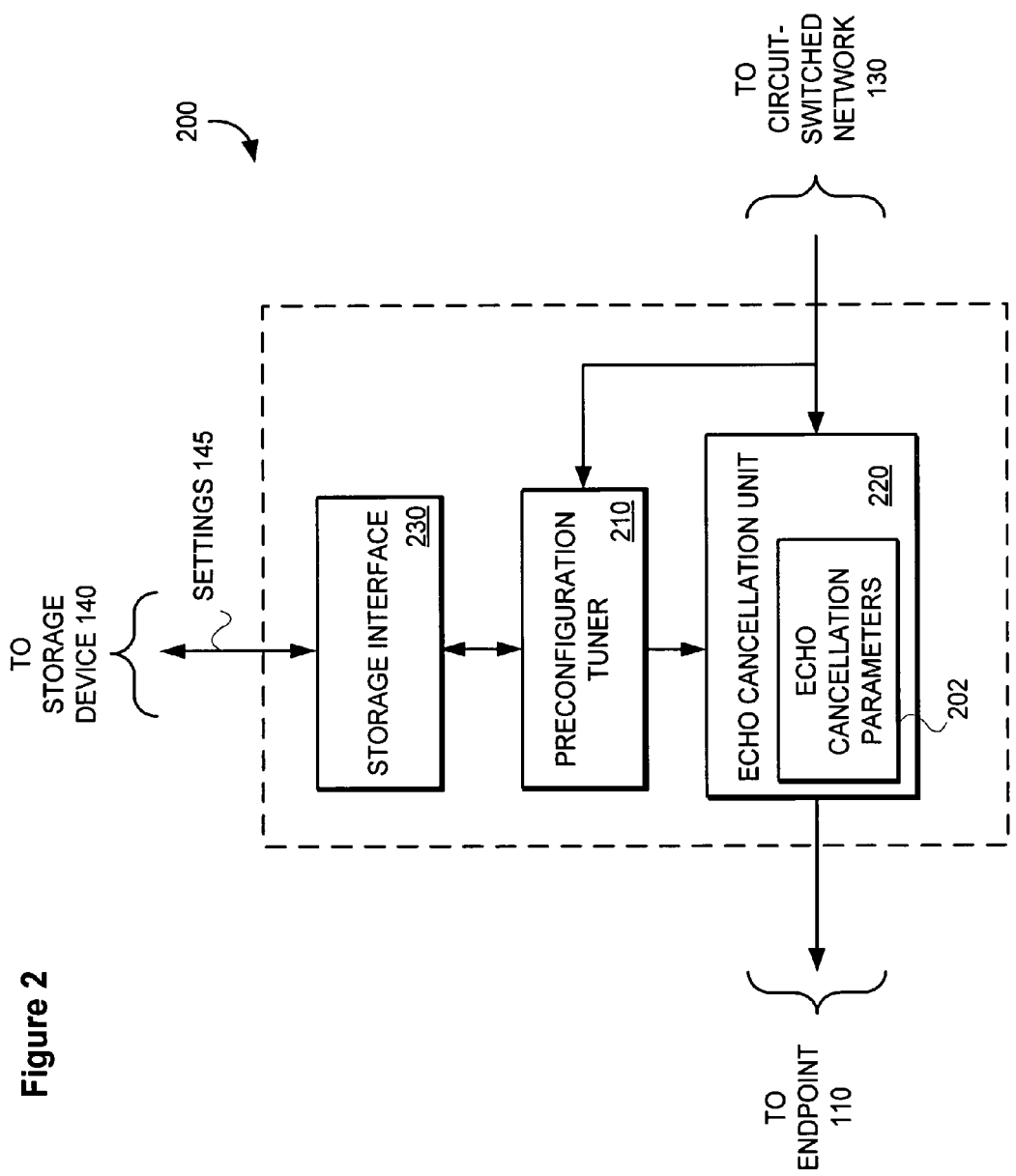
FIG. 2 illustrates, in block form, embodiments of a preconfiguration echo canceller shown in FIG. 1.

FIG. 2 illustrates, in block form, embodiments of a preconfiguration echo canceller 200 shown in FIG. 1. Referring to FIG. 2, the preconfiguration echo canceller 200 includes an echo cancellation unit 220 to cancel echo generated during one or more data connections over the circuit-switched network 130. The echo cancellation unit 220 cancels the generated echo according to one or more echo cancellation parameters 202.

The preconfiguration echo canceller 200 includes a preconfiguration tuner 210 to initially configure the echo cancellation parameter 202 for new data connections. This initial configuration allows the echo cancellation unit 220 cancel echo initially generated during the new data connections. The preconfiguration tuner 210 may initially configure the echo cancellation parameters 202 according to settings 145 developed during previous data connections.

During the data connections, the preconfiguration tuner 210 may receive the generated echo from the circuit-switched network 130 and automatically tune the echo cancellation parameters 202 according to the generated echo. This automatic tuning of the echo cancellation parameters 202 during the data connections allows the echo cancellation unit 220 to dynamically cancel the generated echo.

The preconfiguration echo canceller 200 includes a storage interface 230 for exchanging settings 145 developed during data connections with the storage device 140. The storage interface 230 receives the settings 145 developed during data connections and sends them to the storage device 140. For new data connections, the storage interface 230 receives one or more of the previously developed settings 145 from the storage device 140 and provides the settings 145 to the preconfiguration tuner 210 for use in initially configuring the echo cancellation parameters 202. In some embodiments, the storage interface 230 may directly configure the echo cancellation unit 220 with the settings 145.

Figure 3:
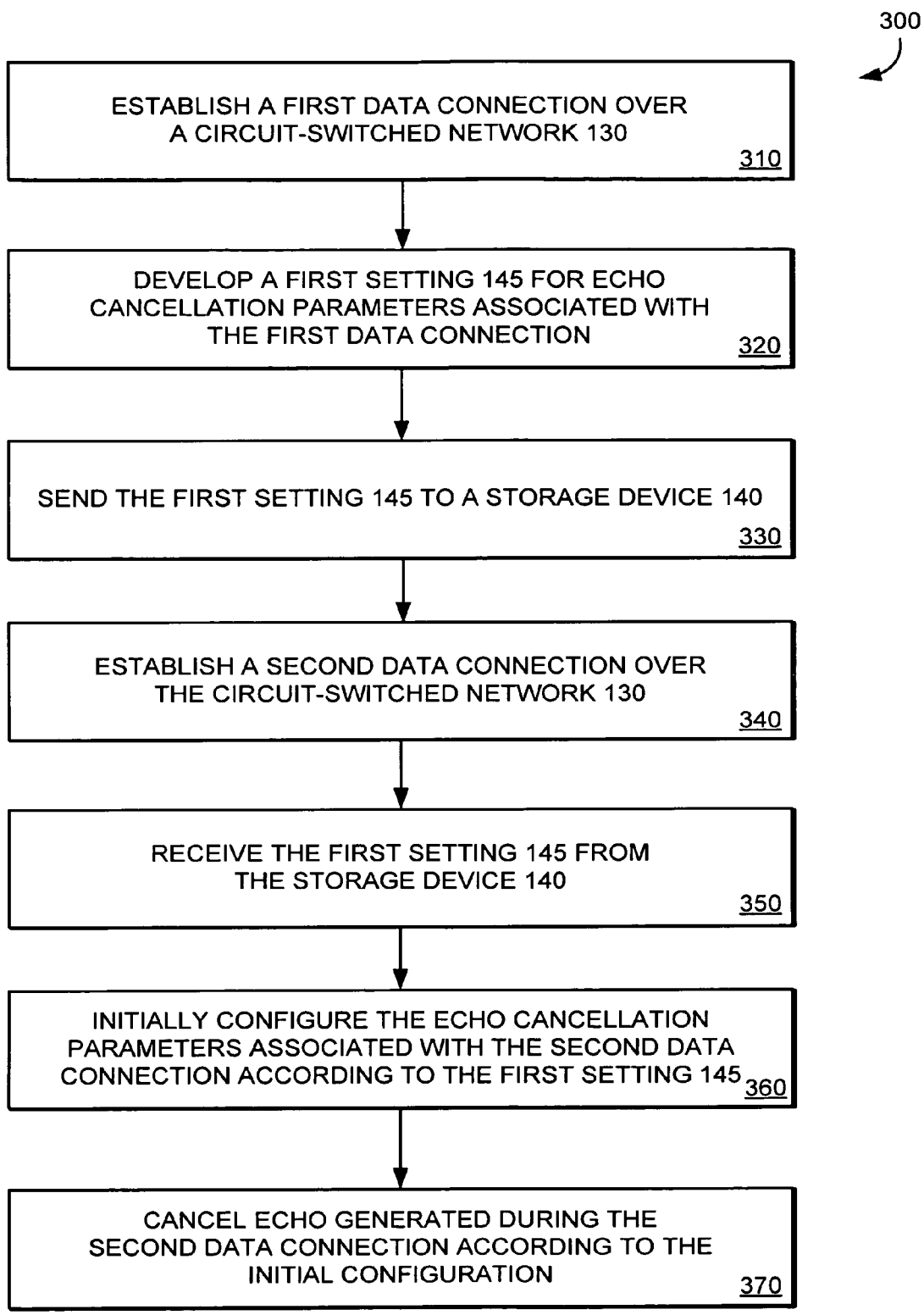
FIG. 3 shows an example flow chart showing the operation of the preconfiguration echo canceller.

FIG. 3 shows an example flow chart showing the operation of the preconfiguration echo canceller 200. Referring to FIG. 3, at block 310, a first data connection over a circuit-switched network 130 is established. The first data connection may be between the endpoints 110 and 120 (FIG. 1), or with one or more other endpoints (not shown) coupled to the circuit-switched network 130. In some embodiments, the first data connection may be a voice call to a Public-Switched Telephone Network on a specific voice bearer channel.

At block 320, the preconfiguration echo canceller 200 develops a setting 145 for echo cancellation parameters 202 associated with the first data connection. The preconfiguration echo canceller 200 may develop the setting 145 by automatically tuning the echo cancellation parameters 202 according to the echo generated during the first data connection. At block 330, the preconfiguration echo canceller 200 sends the setting 145 developed during the first data connection to a storage device 140, where the storage device 140 stores the setting 145.

At block 340, the establishment of a second data connection over the circuit-switched network 130 is initiated. The second data connection may be between the endpoints 110 and 120 (FIG. 1), or with one or more other endpoints (not shown) coupled to the circuit-switched network 130. In some embodiments, the first and second data connections share a common endpoint 120 over the circuit-switched network 130 and/or connect to the circuit-switched network 130 through a common port (not shown) from the preconfiguration echo canceller 200.

At block 350, the preconfiguration echo canceller 200 receives the setting 145 from the storage device 140. The preconfiguration echo canceller 200 may receive the setting 145 from the storage device 140 according to relationship between the first and second data connections, e.g., they share a common endpoint 120 and/or connect to the circuit-switched network 130 through a common port (not shown). The preconfiguration echo canceller 200 may retrieve the setting 145 from the storage device 140 on a per endpoint basis, and/or on a per port basis. In some embodiments, multiple settings developed over previous data connections are provided to the preconfiguration echo canceller 200 from the storage device 140.

At block 360, the preconfiguration echo canceller 200 initially configures the echo cancellation parameters 202 associated with the second data connection according to the setting 145. The preconfiguration echo canceller 200 may set the echo cancellation parameters 202 associated with the second data connection to the setting 145. When multiple settings are provided to the preconfiguration echo canceller 200, the preconfiguration echo canceller 200 may average, or perform some other mathematical or logical manipulation on the settings prior to initially configuring the echo cancellation parameters 202. At block 370, the preconfiguration echo canceller 200 cancels echo associated with the second data connection according to the initial configuration of the echo cancellation parameters 202.

Figure 4:
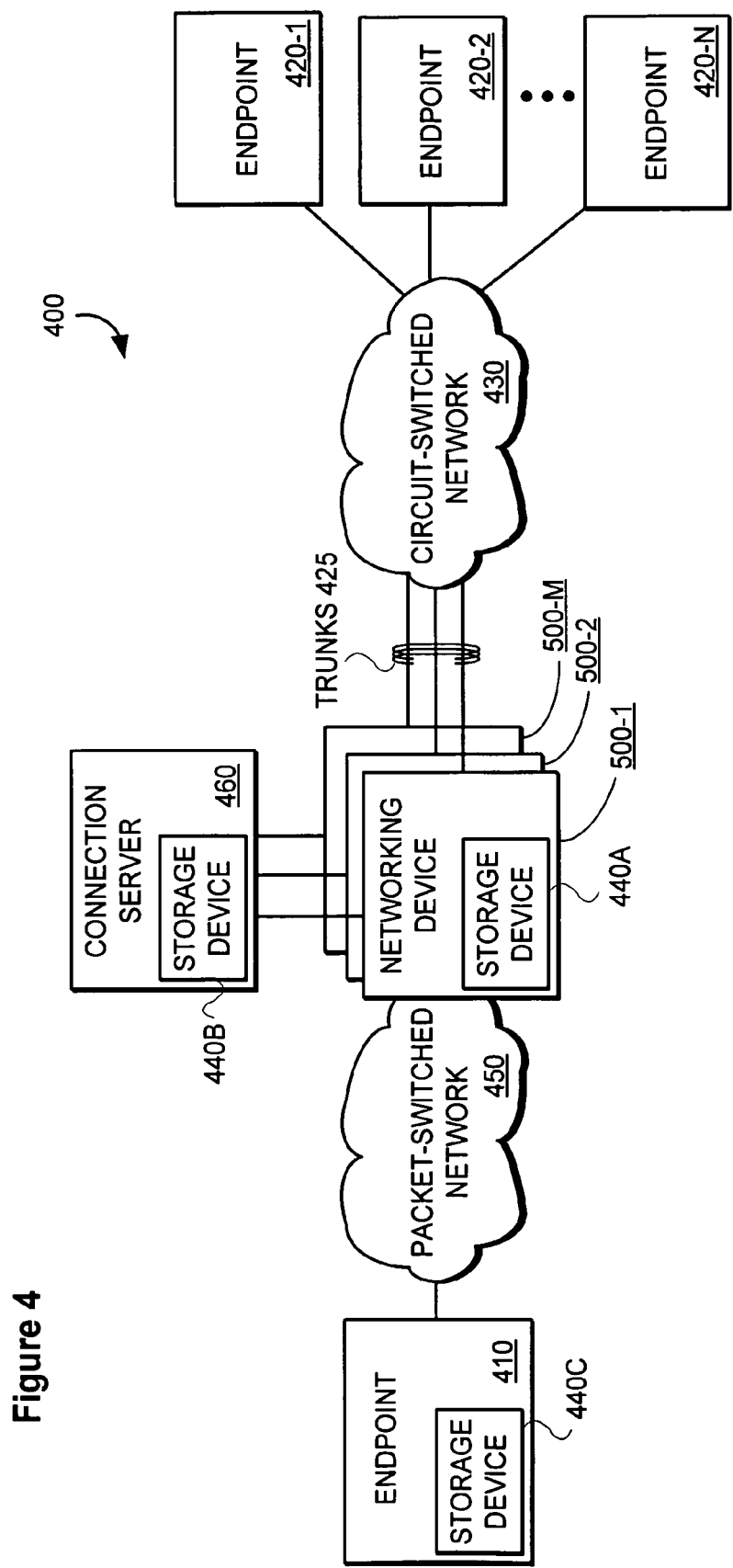
FIG. 4 illustrates, in block form, another communication system that provides improved echo cancellation.

FIG. 4 illustrates, in block form, another communication system 400 that provides improved echo cancellation. The communications system 400 includes a plurality networking devices 500-1 to 500-M for translating data between a packet-switched network 450 and a circuit-switched network 430 during data connections or calls between endpoints 410 and 420-1 to 420-N. The networking devices 500-1 to 500-M may be located on edges of the packet-switched network 450 and coupled to a circuit-switched network 430 through a plurality of trunks 425. The trunks 425 may time-division-multiplex many digital data connections using well-known physical data formats, such as E1 and T1. The circuit-switched network 430 may be a PSTN, a legacy PBX, or any dedicated-path communication network. The packet-switched network 450 may be an Internet Protocol (IP) network, or any other packetized communications network.

A connection server 460 coordinates data connections or calls established through the networking devices 500-1 to 500-M. The connection server 460 may be a Call Manager implementing an H.323 audiovisual standard, or any other device capable of managing data connections over the packet-switched network 450. The networking devices 500-1 to 500-M may be Voice Gateways implementing the H.323 audiovisual standard, or other devices capable of translating data between networks 430 and 450.

The networking devices 500-1 to 500-M maintain the ability to cancel echo generated during data connections over the circuit-switched network 430. The networking devices 500-1 to 500-M cancel echo according to one or more echo cancellation parameters, e.g., input gain, output attenuation, impedance, echo return loss (ERL), combined signal loss (ACOM), etc. The networking devices 500-1 to 500-M may automatically tune the echo cancellation parameters to dynamically develop settings that optimally cancel the generated echo for the data connections. During the establishment of the data connections, the networking devices 500-1 to 500-M may initially configure the echo cancellation parameters according to the settings developed during one or more previous data connections, thus minimizing or eliminating initial echo pass-through to endpoint 410 and/or the tuning required to effectively cancel the generated echo.

The communications system 400 includes storage devices 440A-C for storing the developed settings for use in initially configuring the echo cancellation parameters of one or more subsequently established data connections. The storage devices 440A-C may be caches, memories or other devices capable of storing the developed settings. Although FIG. 4 shows the communications system 400 including all of the storage devices 440A-C, embodiments may be configured to include any combination of the storage devices 440A-C.

Storage device 440A may be located within the networking device 500-1 and store settings developed during data connections through the networking device 500-1. Networking devices 500-2 to 500-M may include storage devices similar to storage device 440A for storing settings developed during their corresponding data connections. The networking device 500-1 may identify and retrieve the settings to initially configure echo cancellation parameters during the establishment of new data connections. By storing the settings within their corresponding networking devices 500-1 to 500-M, the networking devices 500-1 to 500-M may remain backward capable with regard to communications with connection server 460 and endpoint 410.

The networking device 500-1 may identify one or more settings within the storage device 440A on a per endpoint 420-1 to 420-N through the circuit-switched network 430 basis. That is, during the establishment of a data connection with endpoint 420-1, the networking device 500-1 may identify and retrieve one or more settings corresponding to previous data connections with endpoint 420-1. When the networking device 500-1 includes multiple ports to the circuit-switched network 430, the networking device 500-1 may also identify the settings on a per port basis. When the networking device 500-1 identifies multiple settings an average or some other mathematical or logical manipulation of the settings may be performed prior to initially configuring the echo cancellation parameters.

Storage device 440B is located within the connection server 460. The storage device 440B may store settings developed during data connections for one or more of the networking devices 500-1 to 500-M. The connection server 460 may identify and provide settings to the networking devices 500-1 to 500-M during the establishment of subsequent data connections. For instance, during the establishment of a data connection through networking device 500-1, the connection server 460 may identify settings within the storage device 440B and provide the identified settings to the networking device 500-1. In some embodiments, the connection server 460 may provide the settings to the networking devices 500-1 to 500-M within modified H.323 signaling during the establishment of data connections within the networking devices 500-1 to 500-M.

When the connection server 460 identifies multiple settings for the subsequent data connection, the connection server 460 may average or perform some other mathematical or logical manipulation on the settings to provide a single setting to the associated networking device 500-1 to 500-M. In other embodiments, the connection server 460 may provide all of the settings to the associated networking device 500-1 to 500-M, where the associated networking device 500-1 to 500-M may perform the mathematical or logical manipulation prior to the echo cancellation parameter configuration.

The connection server 460 may identify the settings within the storage device 440B on a per networking device 500-1 to 500-M basis and/or on a per endpoint 420-1 to 420-N through the circuit-switched network 430 basis. That is, during the establishment of a data connection through networking device 500-1 with endpoint 420-1, the connection server 460 may provide the networking device 500-1 one or more settings corresponding to previous data connections through the networking device 500-1 and/or settings corresponding to endpoint 420-1 through the circuit-switched network 430. When the networking device 500-1 includes multiple ports to the circuit-switched network 430, the connection server 460 may also provide the networking device 500-1 settings on a per port basis. In some embodiments, the networking devices 500-1 to 500-M may directly access to the storage device 440B to retrieve the settings.

Storage device 440C is located within endpoint 410. The storage device 440A may store settings developed during data connections for one or more of the networking devices 500-1 to 500-M. The endpoint 410 may identify and provide settings to the networking devices 500-1 to 500-M during the establishment of subsequent data connections. For instance, during the establishment of a data connection through networking device 500-1, the endpoint 410 may identify settings within the storage device 440C and provide the identified settings to the networking device 500-1. When the endpoint 410 identifies multiple settings for the subsequent data connection, the endpoint 410 may average the settings or perform some other mathematical or logical manipulation on the settings, in order to provide a single setting to the associated networking device 500-1 to 500-M. In some embodiments, the endpoint 410 may provide the settings to the networking device 500-1 via the connection server 460.

The endpoint 410 may identify the settings within the storage device 440C on a per networking device 500-1 to 500-M basis and/or on a per endpoint 420-1 to 420-N through the circuit-switched network 430 basis. That is, during the establishment of a data connection through networking device 500-1 with endpoint 420-1, the endpoint 410 may provide the networking device 500-1 one or more settings corresponding to previous data connections through the networking device 500-1 and/or settings corresponding to endpoint 420-1 through the circuit-switched network 430. When the networking device 500-1 includes multiple ports to the circuit-switched network 430, the endpoint 410 may also provide the networking device 500-1 settings on a per port basis.

Figure 5:
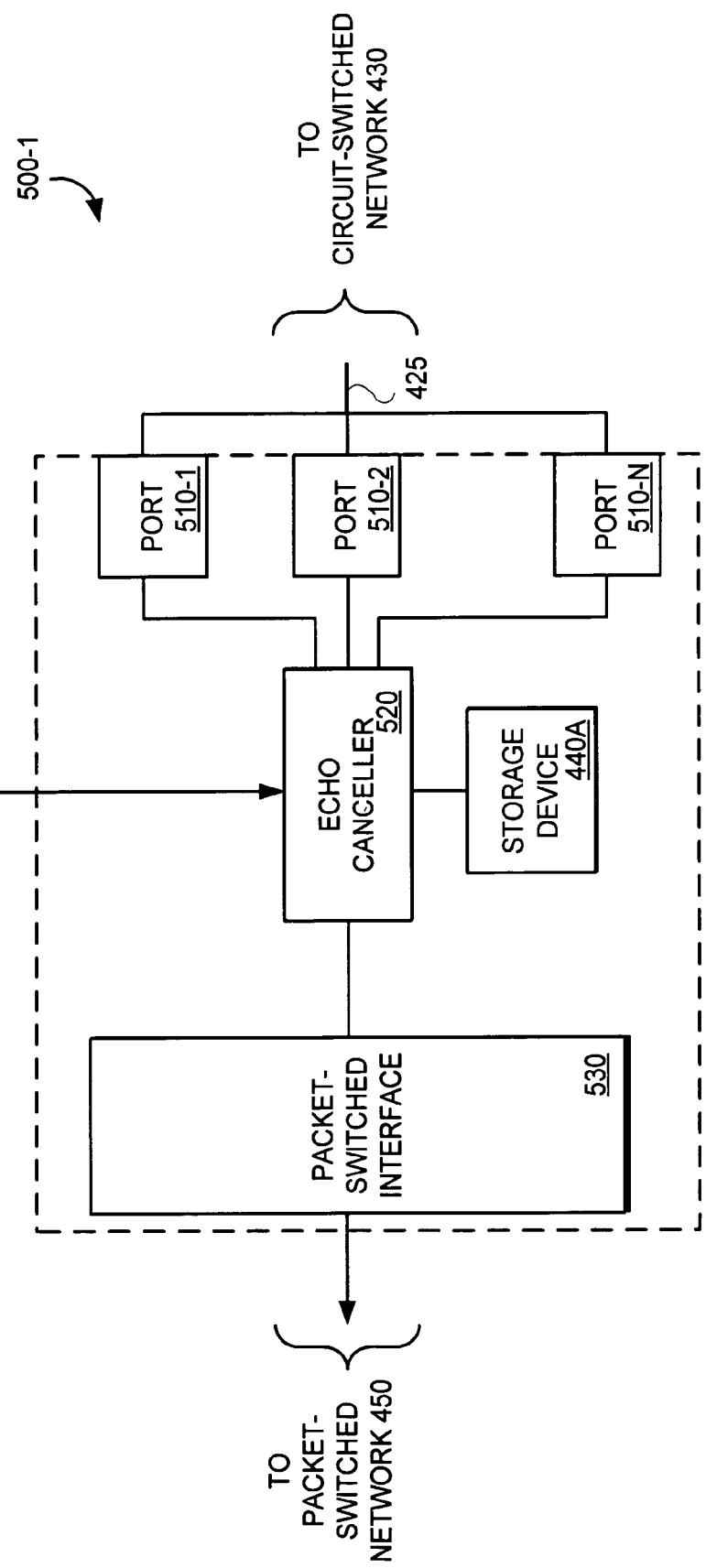
FIG. 5 illustrates, in block form, embodiments of a networking device shown in FIG. 4.

FIG. 5 illustrates, in block form, embodiments of a networking device 500-1 shown in FIG. 4. Networking devices 500-2 to 500-M may be similarly configured to the embodiments of networking device 500-1 shown in FIG. 5 and described below in detail. Referring to FIG. 5, the networking device 500-1 includes a plurality of ports 510-1 to 510-N to couple with the circuit-switched network 430 through trunks 425. Each of the ports 510-1 to 510-N may support one or more data connections over the circuit-switched network 430.

The ports 510-1 to 510-N may be physically distinct from each other, or networking device 500-1 may logically distinguish them.

An echo canceller 520 receives data signals corresponding to data connections over the circuit-switched network 430 from the ports 510-1 to 510-N and cancels echo within the data signals according to echo cancellation parameters. The echo canceller 520 may automatically tune the echo cancellation parameters according to the received echo, thus dynamically eliminating echo from the data signals over the course of the data connections. The echo canceller 520 may provide the non-canceled portion of the data signals to a packet-switched interface 530 for transmission to endpoint 410 (FIG. 4) over the packet-switched network 450.

The echo canceller 520 stores a setting of the tuned echo cancellation parameters for each data connection through the networking device 500-1 to the storage device 440A. In some embodiments, the echo canceller 520 may exchange settings developed during data connections through networking device 500-1 with the connection server 460. The connection server 460 may store the settings within a storage device 440B (FIG. 4). In other embodiments, the echo canceller 520 may exchange the settings with the endpoint 410 (FIG. 4) through the packet-switched interface 530 and the packet-switched network 450. The echo canceller 520 may overwrite settings developed during previous data connections with more recently developed settings. Although FIG. 5 shows the networking device 500-1 including a single echo canceller 520, many other schemes for cancelling echo from the circuit-switched network 430 may be implemented, such as including multiple echo cancellers 520 within networking device 500-1.

During the establishment of one or more subsequent data connections, the echo canceller 520 receives one or more of the settings from the storage device 440A (or storage devices 440B and 440C), and configures the echo cancellation parameters for the subsequent data connections according to the settings. The echo canceller 520 may receive the settings on a per endpoint 420-1 to 420-N (FIG. 4) basis and/or on a per port 510-1 to 510-N basis. For instance, in a data connection with endpoint 420-1 (FIG. 4) through port 510-2, the echo canceller 520 may receive settings corresponding to previous data connections with the endpoint 410, previous data connections through port 510-2, or both.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

The invention claimed is:

1. A method comprising:
developing multiple settings for one or more echo cancellation parameters during multiple data connections established at least partially over a circuit-switched network with multiple endpoints;
averaging the multiple settings developed during the multiple data connections as an aggregated setting of the echo cancellation parameters;
configuring echo cancellation parameters associated with a new data connection according to the aggregated setting of the echo cancellation parameters;
initially cancelling echo for the new data connection with the aggregated setting of the echo cancellation parameters;
subsequently cancelling echo for the new data connection based on received echo in the new data connection; and
updating the aggregated setting of the echo cancellation parameters based on the received echo in the new data connection, wherein the updated aggregated setting is for initial echo cancellation in a subsequent new data connection.

2. The method of claim 1 includes
identifying one or more previously developed settings of echo cancellation parameters according to an endpoint over the circuit-switched network associated with the new data connection; and
assigning the echo cancellation parameters associated with the new data connection according to the identified settings.

3. The method of claim 1 includes
identifying one or more previously developed settings of echo cancellation parameters according to a port accessing the circuit-switched network associated with the new data connection; and
assigning the echo cancellation parameters associated with the new data connection according to the identified settings.

4. A device comprising:
means for developing multiple settings for one or more echo cancellation parameters during multiple data connections established at least partially over a circuit-switched network;
means for combining the multiple settings of the echo cancellation parameters into a new setting of the echo cancellation parameters on a per port basis;
means for configuring echo cancellation parameters associated with a new data connection according to the new setting of the echo cancellation parameters on the per port basis;
means for cancelling echo for the new data connection with the new setting of the echo cancellation parameters;
means for identifying one or more previously developed settings of echo cancellation parameters according to a port accessing the circuit-switched network associated with the new data connection; and
means for assigning the echo cancellation parameters associated with the new data connection according to the identified settings.

5. The device of claim 4 wherein the means for combining is configured to average the settings developed during the multiple data connections, wherein the means for configuring configures the echo cancellation parameters associated with the new data connection according to the averaged settings.

6. The device of claim 4 includes
means for identifying one or more previously developed settings of echo cancellation parameters according to an endpoint over the circuit-switched network associated with the new data connection; and
means for assigning the echo cancellation parameters associated with the new data connection according to the identified settings.

7. An apparatus including a computer-readable memory device storing computer instructions that are configured to cause a processor or multiple communicating processors to perform operations comprising:
developing multiple settings for echo cancellation parameters during multiple data connections established at least partially over a circuit-switched network using multiple ports of the apparatus;

aggregating the multiple settings of echo cancellation parameters into a new setting for the echo cancellation parameters when a new data connection is initiated;

initially configuring echo cancellation parameters associated with the new data connection with the new setting of the echo cancellation parameters based on the multiple settings for echo cancellation parameters developed over multiple data connections using multiple ports of the apparatus;

subsequently cancelling echo for the new data connection based on received echo in the new data connection; and updating the new setting of the echo cancellation parameters based on the received echo in the new data connection, wherein the updated new setting is for subsequent new data connections.

8. The apparatus of claim 7 wherein the instructions are further configured to cause the processor or multiple communicating processors to perform operations comprising:

averaging the multiple settings developed during the multiple data connections; and configuring the echo cancellation parameters associated with the new data connection according to the averaged settings.

9. The apparatus of claim 7 wherein the instructions are further configured to cause the processor or multiple communicating processors to perform operations comprising:

identifying one or more previously developed settings of echo cancellation parameters according to an endpoint over the circuit-switched network associated with the new data connection; and assigning the echo cancellation parameters associated with the new data connection according to the identified settings.

10. The apparatus of claim 7 wherein the instructions are further configured to cause the processor or multiple communicating processors to perform operations comprising:

identifying one or more previously developed settings of echo cancellation parameters according to a port accessing the circuit-switched network associated with the new data connection; and assigning the echo cancellation parameters associated with the new data connection according to the identified settings.

11. A system comprising:

a storage device to store, on a per port basis, multiple settings of echo cancellation parameters developed during multiple previously established data connections with multiple endpoints; and a networking device to initially configure echo cancellation parameters associated with new data connections, on the per port basis, according to a combination of multiple settings from multiple data connections with multiple endpoints from the storage device and subsequently configure echo cancellation parameters for the new data connection based on received echo in the new data connection, wherein the networking device is configured to cancel hybrid echo generated in the new data connections according to the combination of the multiple settings of echo cancellation parameters, wherein the networking device is configured to update, for use with subsequent new data connections, the combination of the multiple settings of echo cancellation parameters according to the received echo in the new data connection.

12. The system of claim 11 wherein the networking device includes the storage device.

13. The system of claim 11 wherein the networking device is configured to average the multiple settings from the storage device, and initially configure the echo cancellation parameters associated with the new data connections according to the average of the multiple settings.

14. The system of claim 11 including a plurality of networking devices, each to initially configure echo cancellation parameters for corresponding data connections according to settings from the storage device.

15. The system of claim 14 including a connection server to manage the data connections for the networking devices, where the connection server includes the storage device.

16. The system of claim 11 wherein an endpoint of at least one of the data connection includes the storage device.

17. The system of claim 11 wherein the networking device translates data between a circuit-switched network and a packet-switched network.

18. The system of claim 11, wherein the echo cancellation parameters include one or more of input gain, output attenuation, impedance, echo return loss (ERL), and combined signal loss (ACOM).

19. A method comprising:

identifying a port associated with a data connection established over a circuit-switched network;

accessing multiple echo cancellation settings stored from multiple past data connections;

averaging the multiple echo cancellation setting to form an initial echo cancellation setting;

receiving a request for a new data connection;

establishing the new data connection using the initial echo cancellation setting for a first time period;

detecting echo in the new data connection to form a new echo cancellation setting;

switching the new data connection to the new echo cancellation setting during a second time period;

storing the new echo cancellation setting; and averaging the new echo cancellation setting with the multiple echo cancellation setting to form an updated initial echo cancellation setting.

20. The method of claim 19, wherein the request for the new data connection is received from an endpoint not associated with any of the multiple past data connections used to form the multiple echo cancellation settings.

21. The method of claim 19, further comprising:

receiving a second request for a second new data connection from a different endpoint; and establishing the second new data connection using the initial echo cancellation setting for the first time period.

* * * * *